FIG. I

INVENTOR.
BURT R. HOPSTEIN.
BY Frank N. Decker Jr.
ATTORNEY.

INVENTOR.
BURT R. HOPSTEIN.
BY Frank U. Decker jr.
ATTORNEY.

United States Patent Office 3,236,063
Patented Feb. 22, 1966

3,236,063
ABSORPTION REFRIGERATION SYSTEMS
Burt R. Hopstein, Fayetteville, N.Y., assignor to Carrier Corporation, Syracuse, N.Y., a corporation of Delaware
Filed Aug. 27, 1962, Ser. No. 219,436
2 Claims. (Cl. 62—476)

This invention relates to absorption refrigeration systems, and, more particularly, to the inhibition of corrosion in the generator section of absorption refrigeration apparatus.

Absorption refrigeration machines are advantageously adapted to utilize many different types of heat sources to supply power for the operation of the refrigeration system. In many installations, a hot liquid, such as water, may be available as a waste or product from which energy may be captured to operate an absorption refrigeration machine at little or no additional operating cost. In recent years there has been a trend toward utilizing larger capacity absorption refrigeration machines because of the inherently greater economy in installing a single larger capacity absorption machine to perform the refrigeration which would otherwise be required by two or more smaller size machines. Likewise, in order to achieve the maximum capacity from a particular size absorption refrigeration machine, it is desirable in many cases to employ relatively higher temperature heat sources for operation of the generator rather than constructing a larger size machine.

One of the principal limitations on the capacity of a given size absorption refrigeration machine is the maximum temperature at which the generator may be safely operated without significantly accelerating the corrosion rate. Many common salt solutions which are used as absorbents in the present day absorption refrigeration equipment tend to accelerate corrosion of metal parts, such as heat exchange tubes and tube sheets, with which the absorbent solution is in contact at high temperatures.

Present day large capacity absorption refrigeration machines frequently employ a refrigerant such as water and a hygroscopic absorbent solution such as lithium bromide. After the absorbent solution has absorbed a substantial quantity of water vapor to provide the refrigeration effect of the machine, it becomes necessary to reconcentrate the absorbent solution in order to continue to provide additional refrigeration. The reconcentration of the absorbent solution is normally achieved by passing weak absorbent solution which has absorbed a substantial quantity of water vapor to a generator section where the weak solution is heated, driving off the water vapor and concentrating the remaining absorbent solution.

The generator section often comprises a heat exchanger having a shell and tube sheets cooperating with the shell to form an enclosure in which the weak absorbent solution is heated. A plurality of heat exchange tubes, which are adapted to carry a heating medium such as hot water, are secured in openings formed in the tube sheets. A suitable header is provided adjacent one of the tube sheets for passing the hot water or other hot liquid heating medium into the open ends of the heat exchange tubes.

It will be seen that the absorbent salt solution is in contact with the interior faces of the tube sheet as well as the heat exchange tubes in the interior of the generator section. It has been found that when the temperature of the heating medium passed through the heat exchange tubes exceeds approximately 300° F., there is a tendency for greatly accelerated corrosion of the tube sheet to take place at the interior face of the tube sheet where the heat exchange tubes pass the interior face of the generator section.

Applicant has found that the reason for this characteristic type of corrosion in high temperature absorption refrigeration machines is direct conduction of heat from the heating medium through the heat exchange tube wall to the interior face of the tube sheet. Since the heating medium has not given up any substantial portion of its heat at this point in its flow through the heat exchange tube, the interior face of the tube sheet becomes relatively very hot and corrosion of both the heat exchange tube and the tube sheet is greatly accelerated.

Consequently, it conventionally becomes necessary to utilize a highly corrosion resistant material, such as stainless steel, for the tube sheet of the generator of a high temperature absorption refrigeration machine. However, stainless steel tube sheets are substantially more expensive than mild steel tube sheets. Furthermore, if it is desired to convert an existing refrigeration machine for use at higher temperatures, it becomes expensive to replace the tube sheets with stainless steel because the entire generator section of the machine must be retubed.

Applicant has also discovered that by inhibiting heat transfer directly through the heat exchange tube wall to the tube sheet, relatively high temperature heating mediums can be safely utilized to provide relatively large refrigeration capacities with a given size absorption refrigeration machine employing mild steel tube sheets without excessive corrosion.

Accordingly, it is a principal object of this invention to provide an improved method and construction which is adapted for use with the generator section of an absorption refrigeration machine to enable utilization of relatively high temperature heating mediums while inhibiting excessive corrosion of the tube sheet.

It is a further object of this invention to provide improved method means for inhibiting corrosion in the generator section of an absorption refrigeration machine.

These and other objects of this invention are achieved in the illustrated preferred embodiment thereof by providing an absorption refrigeration machine generator of the type described with tubular inserts of relatively poor heat conducting material in the open ends of the heat exchange tubes through which the relatively hot liquid heating medium is admitted into the generator. Desirably, the tubular inserts may comprise a plastic material such as polytetrafluoroethylene, which is resistant to high temperatures while at the same time of sufficiently low thermal conductivity to inhibit heat transfer from the heating medium to the heat exchange tube in the region of the insert. The tubular inserts are placed in the open ends of the first pass of heat exchange tubes and extend a distance into the tubes past the interior face of the tube sheets in order to reduce the temperatures in this region which has been found to be particularly susceptible to corrosion.

However, suitable tube insert materials, such as polytetrafluoroethylene, are difficult to retain in position in a metal heat exchange tube due to the fact that conventional bonding means, such as organic cements, are themselves unable to withstand the temperatures to which they would be heated in the application described and because of the shearing effect on the bonding agent due to differential thermal expansion between the tube insert and the heat exchange tube. For this purpose, a spring insert comprising a resilient corrosion resistant material such as stainless steel is utilized to expand the plastic tubular insert into engagement with the interior walls of the heat exchange tube to retain the tubular insert in the desired position.

By the practice of this invention it has been found that the temperature of the interior face of a tube sheet in the generator section of an absorption refrigeration machine utilizing 380° F. hot water, for example, as a heating medium can be reduced under typical operating conditions from about 340° F. to about 265° F. while maintaining the generator solution temperature at about 220° F. At the same time, the plastic tube inserts have been found to be firmly retained in position by the spring insert described.

These and other objects of this invention will become readily apparent by reference to the following detailed description and the accompanying drawings wherein.

Figure 1:
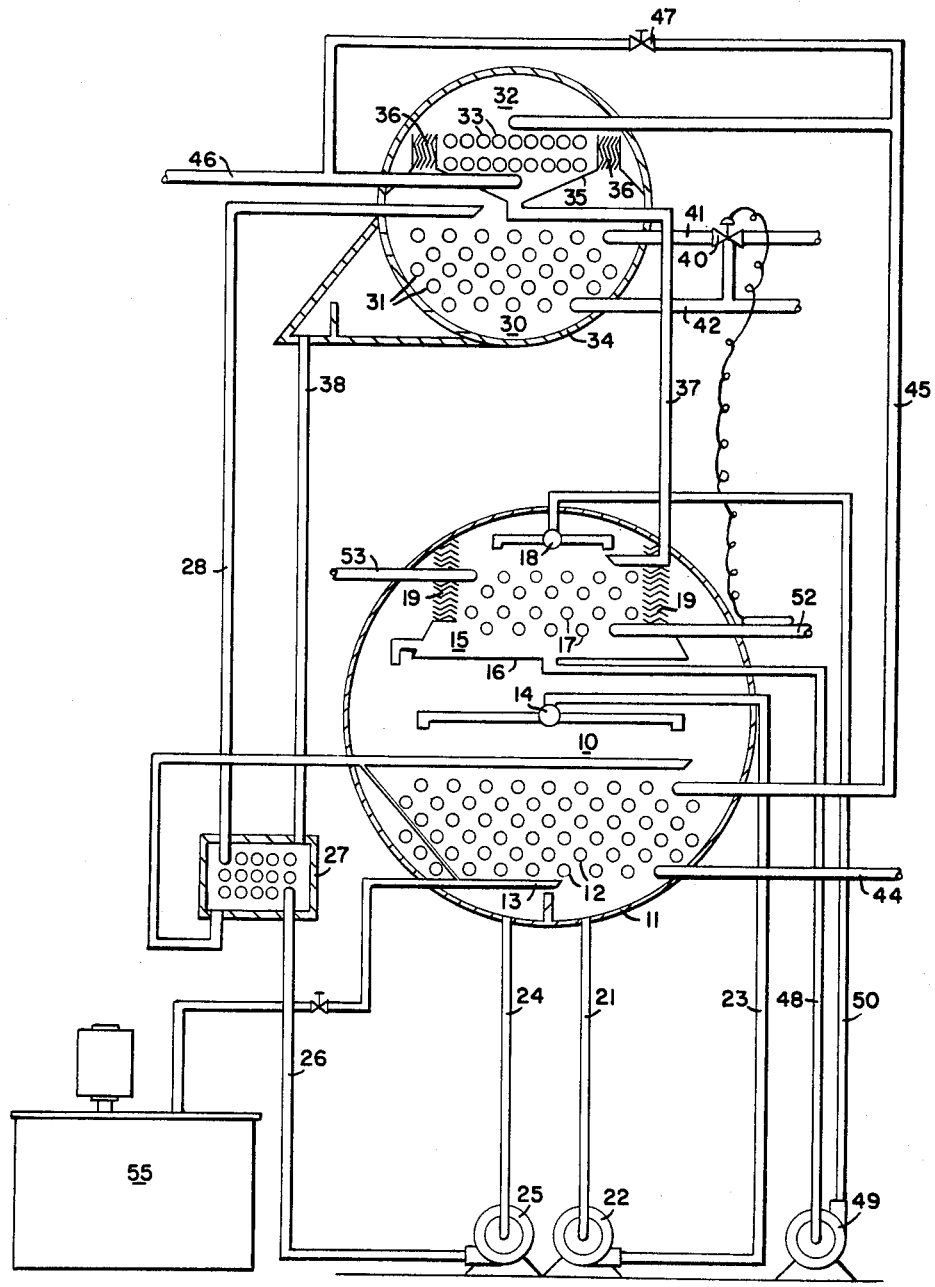
FIGURE 1 is a schematic diagram partly in cross-section of an absorption refrigeration machine.

Referring to FIGURE 1 of the drawing, there is shown an absorption refrigeration machine comprising an absorber section 10 within a shell 11. A plurality of heat exchange tubes 12 are provided within the absorber section. A purge line 13 leads from a suitable region of the absorber and serves to conduct non-condensible gases therefrom to a suitable purge unit 55. A spray header 14 is located above the absorber section.

Also disposed in shell 11 is an evaporator section 15 comprising a pan-like member 16 within which may be disposed a plurality of heat exchange tubes 17. A spray header 18 may be located above heat exchange tubes 17 for distributing refrigerant thereover. A plurality of eliminators 19 are provided to prevent entrained liquid refrigerant particles being carried from evaporator section 15 to absorber section 10. Evaporator section 15 is in communication with absorber section 10 through eliminators 19.

In operation, the system is evacuated to a low pressure by being purged of relatively non-condensible gases by a suitable purge unit 55 and a refrigerant is sprayed over tubes 17 in evaporator section 15 while a suitable absorbent solution is sprayed over tubes 12 in absorber section 10.

Fluid passing through heat exchange tubes is cooled by vaporization of refrigerant in evaporator section 15. The vaporized refrigerant passes through the eliminators into absorber section 10 where the refrigerant vapor is absorbed by the absorbent solution. The heat required to vaporize the refrigerant in evaporator section 15 is provided by the fluid passing through heat exchange tubes 17 which is thereby cooled, and this heat is carried with the vapor into absorber section 10 where it is given up to a cooling fluid passing through heat exchange tubes 12. Thus, the evaporation of refrigerant in evaporator section 15 produces a cooling or refrigeration effect on the fluid passing through heat exchange tubes 17 by removing heat therefrom to vaporize the refrigerant.

Line 21 is connected to solution recirculation pump 22 and serves to circulate absorbent solution of intermediate strength accumulated in one section of the lower portion of absorbent section 10 through line 23 to spray header 14 in order to recirculate absorbent solution in the absorber. A line 24 leads from another section of the lower poriton of absorber section 10 containing weak solution and weak solution pump 25 serves to pass the weak solution through line 26 and solution heat exchanger 27 through weak solution line 28 to generator section 30.

As used herein, the term "strong solution" refers to an absorbent solution strong in absorbing power, and the term "weak solution" refers to absorbent solution weak in absorbing power. The term "intermediate strength solution" refers to a solution having a concentration intermediate that of the strong solution and weak solution.

A suitable absorbent for a refrigeration system of the type described comprises a hygroscopic aqueous salt solution as lithium bromide and water and a suitable refrigerant is water. The concentration of the strong solution leaving the generator may be about 65%.

The absorption of refrigerant vapor by absorbent solution in absorber section 10 dilutes the absorbent solution, reducing its absorptive power. Therefore, the weak solution is concentrated by separating it from the absorbed refrigerant and returning the refrigerant to the evaporator section and the concentrated absorbent solution to the absorber section. For this purpose, a generator section 30 and a condenser section 32 are provided.

Generator section 30 is located in shell 34 and comprises a plurality of heat exchange tubes 31 for placing hot water or other heating fluid in heat exchange relation with solution in the generator. Also located within shell 34 is condenser section 32 comprising a pan-like member 35 within which is disposed a plurality of heat exchange tubes 33 through which cooling water is passed. Eliminators 36 are provided to prevent strong solution from being entrained in refrigerant vapor passed from generator section 30 to condenser section 32.

A line 37 leads from pan-like member 35 to evaporator section 15 and serves to return condensed refrigerant from the condenser section to the evaporator section. Strong solution return line 38 extends from generator section 30 to solution heat exchanger 27 to absorber section 10 and serves to return relatively hot, strong absorbent solution from the generator section to the absorber section while passing it in heat exchange relation with relatively cool, weak solution being forwarded to the generator for concentration thereof.

A heating medium inlet line 41 and a heating medium outlet line 42 are provided to admit a suitable heating medium such as hot water to heat exchange tubes 31 in order to boil off refrigerant vapor from weak solution supplied to the generator thereby concentrating the weak solution. A suitable three-way valve 40 responsive to leaving chilled water temperature in line 52 is provided to control the refrigeration capacity produced by the system by modulating the quantity of heating medium supplied to the generator section and bypassing the unneeded heating medium around the generator section.

The vaporized refrigerant passes through eliminators 36 and is condensed in condenser 32. For this purpose, a cooling water inlet line 44 is connected to heat exchange tubes 12 in absorber section 10 through which the cooling water passes through line 45 to heat exchange tubes 33 in the condenser section. The cooling water is then discharged through line 46 and an appropriate bypass line and valve 47 may be provided to initially provide the desired flow of cooling water through the condenser section, if desired.

A suitable recirculation line 48 and refrigerant recirculation pump 49 are provided to pass refrigerant from pan 16 of the evaporator section through line 50 to spray header 18 so that refrigerant may be sprayed over heat exchange tubes 17 to wet them and aid in cooling of the medium passing through heat exchange tubes 17. Lines 52 and 53 are provided to conduct a heat exchange fluid, such as water, through heat exchange tubes 17 to cool the fluid by the resulting heat exchange with the cooled refrigerant in evaporator 15. This cooled heat exchange fluid is then passed by a pump (not shown) to suitable remotely located heat exchangers to provide cooling in the desired regions.

Figure 2:
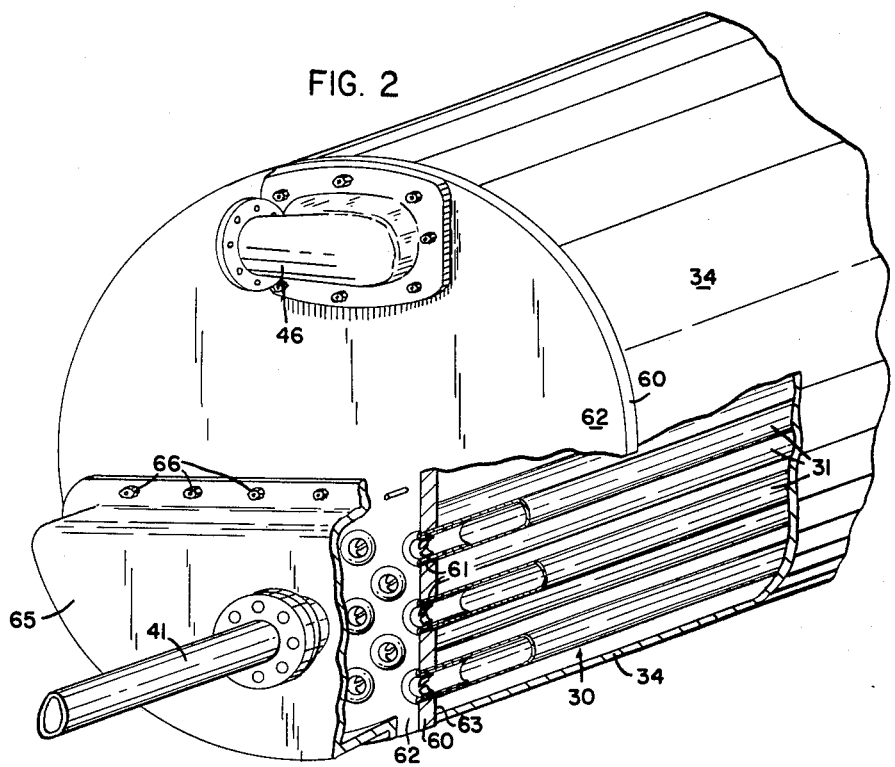
FIGURE 2 is a perspective view of a portion of the refrigeration machine shown in FIGURE 1 partially cut away to illustrate the application of this invention in a generator section.

Referring to FIGURE 2, there is shown a perspective view of shell 34 which houses generator section 30 and condenser section 32. Generator section 30 is formed by the lower portion of shell 34 in cooperation with a pair of spaced tube sheets 60, only one of which is shown in this figure. Tube sheet 60 may desirably be formed of mild steel or other inexpensive corrosion resistant material. Tube sheet 60 has formed therein a plurality of openings 61 which extend from exterior face 62 to interior face 63 of the tube sheet and are adapted to receive heat exchange tubes 31. It will be understood that the interior face 63 of tube sheet 60 is that face which is interior of generator section 30 and in cooperation with shell 34 forms a container adapted to contain the absorbent solution.

Header 65 is secured to exterior face 62 of tube sheet 60 by suitable fastening bolts 66. Header 65 cooperates with the exterior face 62 of tube sheet 60 to form a "water box" or passage means for distributing heating medium supplied through line 41 to heat exchange tubes 31.

Heat exchange tubes 31 are preferably secured in fluid tight engagement with the walls which form openings 61 in the tube sheet by rolling, swaging or other suitable means. Heat exchange tubes 31 have an open end 64 which is disposed adjacent exterior face 62 of tube sheet 60. In practice, ends 64 may project slightly outwardly from exterior face 62. Heat exchange tubes 31 extend from a region adjacent exterior face 62 through tube sheet 60 past interior face 63 into the interior of generator section 30.

Figure 3:
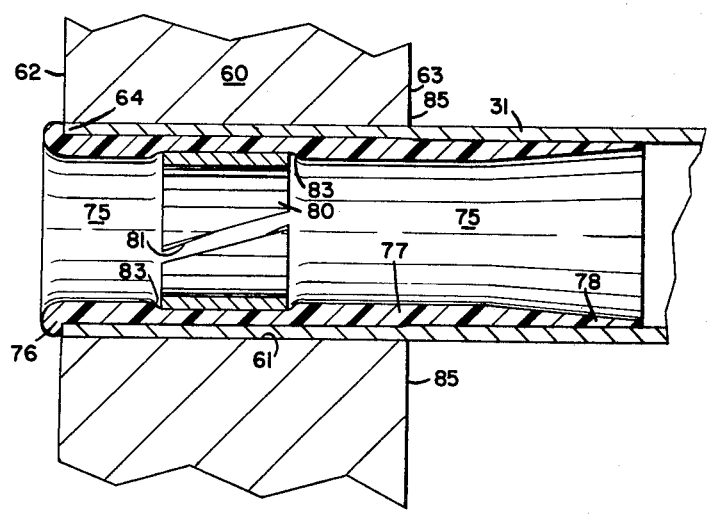
FIGURE 3 is a cross-sectional view through a portion of a tube sheet and heat exchange tube constructed in accordance with this invention.

A tubular insert 75 is inserted into the open end 64 of each of heat exchange tubes 31. Tubular insert 75 is desirably made of a relatively low thermal conductivity material, with respect to tubes 31 such as a plastic so as to provide a high thermal resistance path from the interior thereof to interior face 63. It has been found that polytetrafluoroethylene has the unusually satisfactory combination of low thermal conductivity characteristics while at the same time being able to withstand the effects of high temperature heating medium without serious thermal decomposition. Tubular insert 75 includes an enlarged head portion 76 slightly overlapping the open end 64 of heat exchange tube 31, if desired, a cylindrical body portion 77, and a tapered tail portion 78, as shown in FIGURE 3. It will be observed that tubular insert 75 has an axial length substantially greater than the thickness of tube sheet 60. The tubular insert extends from adjacent exterior face 62 of tube sheet 60 coaxially through tube sheet 31 and opening 61 in the tube sheet and extends to a region spaced on the interior side of interior face 63 of the tube sheet. For example, if tube sheet 60 is approximately one inch in thickness, tubular insert 75 may desirably be about three inches long so as to provide a long thermal conductivity path from the heated portion of tube 31 to interior face 63.

Materials such as polytetrafluoroethylene can not be satisfactorily secured to metals such as copper, of which heat exchange tube 31 is typically made, due to the characteristics of the plastic itself and to the differing thermal expansion characteristics of the metal and other resinous materials which might be used. For this purpose, a spring insert ring 80 comprising a resilient corrosion resistant material such as stainless steel is positioned coaxially in heat exchange tube 31 and tubular insert 75. Spring insert 80 has an inclined split portion 81 which provides means to compress the normal exterior diameter of the spring insert to facilitate its insertion into the interior of tubular insert 75. As shown in the drawing, split portion 81 is inclined at a sufficiently acute angle to the edges of cylindrical spring insert 80 so that a portion of the entire inner circumference of tubular insert 75 is in contact with spring insert 80 at some point.

The generator section of an absorption refrigeration machine in accordance with this invention is assembled in any suitable manner usually involving the securing of heat exchange tubes 31 into openings 61 in tube sheet 60 by positioning the heat exchange tube in the tube sheet and rolling the heat exchange tube into the opening to make a fluid type contact therebetween. Tubular inserts 75 are then positioned in the open ends of heat exchange tubes 64 coaxially therewith so that they extend from adjacent exterior wall 62 past interior wall 63 to a region interiorly spaced from interior wall 63.

Spring insert 80, having been first formed into a hollow cylindrical shape and provided with a suitably inclined split 81 having spaced edges, is contracted so that its exterior diameter is less than the interior diameter of tubular insert 75 and inserted into the interior of the tubular insert. After being axially positioned at a suitable region between the ends of the tubular insert in the interior thereof, the spring insert is permitted to expand by its own resiliency against the interior diameter of the tubular insert to expand the tubular insert into tight engagement with the interior wall of heat exchange tubes 31.

This method of assembly serves to retain the tubular inserts tightly in position in the interior of heat exchange tubes 31 notwithstanding the differing temperature coefficients of expansion of the material of the tubular insert and the heat exchange tubes. At the same time, the spring insert, which desirably has a thickness less than that of the tubular insert, forms a slight groove 83 in the interior of the tubular insert so as not to materially obstruct the flow of heating medium through the tubular insert and provides a relatively smooth path for the uninterrupted flow of heating medium.

In operation, a suitable heating medium such as hot water is supplied through line 41 to header 65 from which it is distributed into the open ends of various heat exchange tubes 31 which are secured in tube sheet 60. This relatively hot heating medium flows through tubular inserts 75 and then into contact with the interior of heat exchange tubes 31 at a point spaced from interior face 63. However, tubular insert 75 provides a relatively high thermal resistance path or barrier, with respect to that afforded by the tubes alone to the direct conduction of heat from the hot heat exchange medium through the wall of the heat exchange tube to the region 85 of interior face 63 at which heat exchange tube 31 emerges from interior face 63 of tube sheet 60. Tubular insert 75 preferably extends a substantial distance from interior face 63 in order to provide a relatively long heat conduction path through the wall of heat exchange tube 31 to interior face 63 of tube sheet 60 to inhibit convective heat transfer through the solution in the generator to interior face 63 of tube sheet 60. This long heat conduction path, which may in practice suitably be about two inches in length, provides a region for heat dissipation into the relatively cool absorbent solution being heated so that interior face 63 is maintained at a temperature substantially lower than the temperature of the heating medium admitted into the ends of the heat exchange tubes. Since the corrosion rate of the tube sheet is highly dependent upon the temperature to which the tube sheet is permitted to rise, the relatively long thermal conductivity path described effectively prevents interior face 63 of the tube sheet from rising to a temperature at which excessive corrosion occurs.

The substantial lowering of the temperature of region 85 of interior face 63 of tube sheet 60 by the addition of tubular inserts 75 permits the use of relatively high temperature heating medium without the necessity of making tube sheet 60 of an expensive, high corrosion resistant material, such as stainless steel. Since header 65 is typically secured to tube sheet 60 by removable securing means, it is possible to add tubular inserts 75 to an existing refrigeration machine in order to increase its capacity by adapting it to use with higher temperature heating medium or to reduce its corrosion rate.

While tubular inserts may be used in all of the open ends of heat exchange tubes 31, it has been found that it is often only necessary to insert them at the beginning of the first pass of the heating medium through the heat exchanger because the heating medium is normally rapidly cooled in giving up its heat to the absorbent solution in the generator and by the time it emerges from the other ends of heat exchange tubes 31 (not shown) it is cooled to a sufficient temperature such that excessive heating of the opposite tube sheet does not occur. It will also be understood that while a single pass type of heat exchanger is shown in generator section 30, the actual construction may be a multiple pass heat exchanger wherein header 65 divides the tube sheet into a plurality of passages. In such an arrangement tubular inserts 75 generally need be put only in those openings of heat exchange tubes 31 which constitute the beginning of the first pass for the heating medium.

It will be appreciated that the illustrated embodiment discloses the application of this invention to a specific absorption refrigeration machine generator but that the actual construction of the generator may take other forms. For example, shell 34 may actually comprise a partition or pan within an outer casing of the machine and tube sheets 60 may not necessarily form the outer wall of the refrigeration machine, as illustrated. Therefore, the terms used herein are intended in their broad sense to cover the other modifications and embodiments of this invention, which will occur to those skilled in the art.

While I have described a preferred embodiment of the invention, it will be understood that the invention is not limited thereto, since it may be otherwise embodied within the scope of the following claims.

I claim:
1. In an absorption refrigeration system, a corrosion protected generator section including a tube sheet having an interior face associated with the interior of said generator section adapted to contact absorbent solution therein, said tube sheet having a plurality of openings defined therein adapted to receive heat exchange tubes, said generator section further comprising a plurality of heat exchange tubes, each of said heat exchange tubes having an open end disposed in one of said openings in said tube sheet and extending through the interior face of said tube sheet to form a heat exchanger in said generator section, and header means disposed about the open ends of said heat exchange tubes for admitting a heating medium into said heat exchange tubes, the improvement comprising insulation means associated with the ends of said heat exchange tubes effective to thermally protect the interior face of said tube sheet from direct heat transfer from heat exchange medium passed through said heat exchange tubes to thereby reduce corrosion of said tube sheet, said insulation means comprising a tube insert of relatively low thermal conductivity material disposed in the open end of each said heat exchange tube and extending coaxially through said tube sheet to a region of said tube substantially spaced from the interior face of said tube sheet, and a retaining member within said tube insert, said retaining member comprising a resilient spring insert expanding said tube insert into tight engagement with said tube.

2. An absorption refrigeration system as defined in claim 1 wherein said spring insert comprises a tubular spring member having an inclined split portion.

References Cited by the Examiner

UNITED STATES PATENTS

| | | | |
|---|---|---|---|
| 218,393 | 8/1879 | Miller | 110—97 |
| 578,150 | 3/1897 | Kerns | 285—107 |
| 1,617,776 | 2/1927 | Taylor | 285—107 |
| 1,966,231 | 7/1934 | Andrus | 285—55 |
| 2,014,313 | 9/1935 | Damsel | 285—109 |
| 2,225,615 | 12/1940 | Bay | 285—55 |
| 2,310,927 | 2/1943 | Bay | 285—65 |
| 2,806,718 | 9/1957 | Cook et al. | 285—55 |
| 2,918,807 | 12/1959 | Leonard | 62—476 |
| 3,073,352 | 1/1963 | Bay | 285—55 X |

MEYER PERLIN, *Primary Examiner.*

EDWARD J. MICHAEL, ROBERT A. O'LEARY,
*Examiners.*